March 28, 1950     A. VREDENBURG     2,501,799
PIE PAN JUICE CATCHER
Filed Aug. 6, 1946
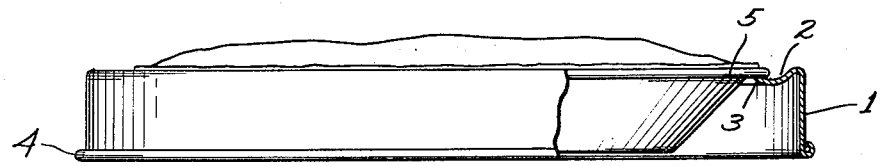
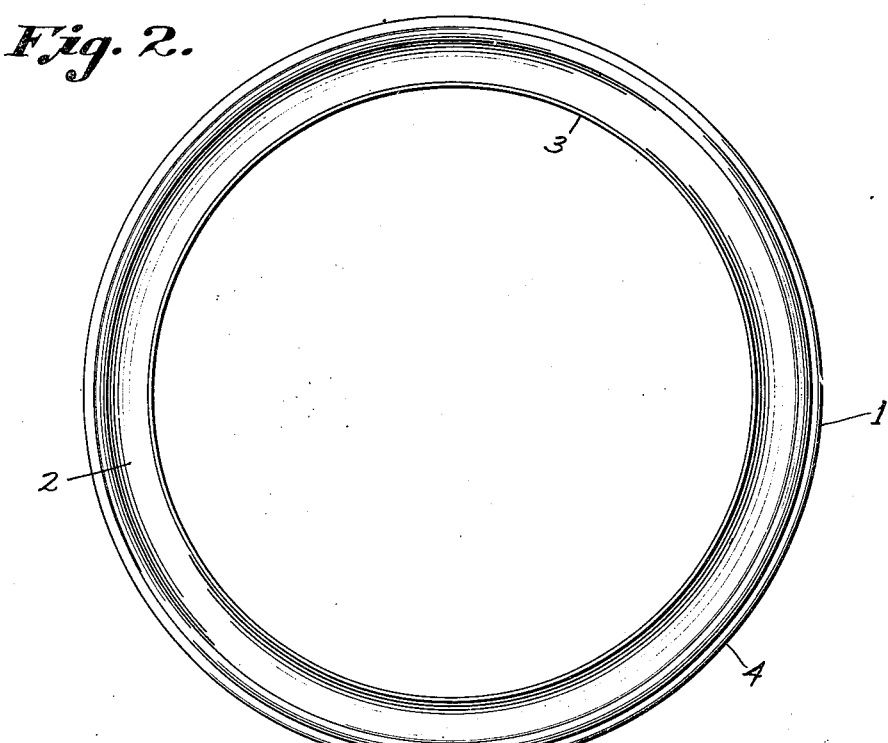
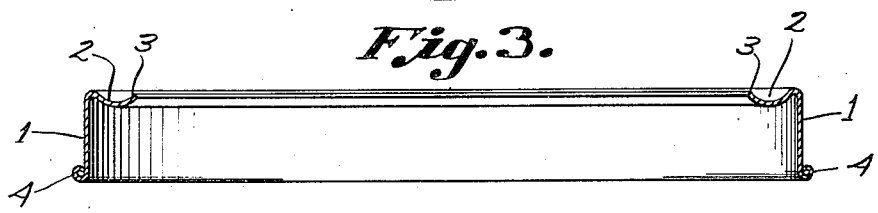
INVENTOR.
Arthur Vredenburg,
BY *Victor J. Evans & Co.*
ATTORNEYS Patented Mar. 28, 1950

2,501,799

UNITED STATES PATENT OFFICE 2,501,799

PIE PAN JUICE CATCHER

Arthur Vredenburg, Waukesha, Wis., assignor to Leo A. Mullaney and Martha L. Cherry, both of Milwaukee, Wis.

Application August 6, 1946, Serial No. 688,676

1 Claim. (Cl. 126—385)

This invention relates to cooking utensils, and more particularly to improvements in utensils for cooking pies and the like.

In the cooking of pies with the usual pie pan, the juices frequently boil over into the oven, producing a messy oven which is difficult to clean. Also, such pans are inconveniently handled when hot, and often are the cause of severe burns.

It is, therefore, an object of this invention to provide a ring having a groove to support the peripheral bead of a pie pan and catch the overflowing juices from the pie being cooked.

A further object is the provision of a juice catching ring having a shallow groove of large radius, which can be easily cleaned, and into which surplus juices will definitely flow without clinging to a pie pan.

A further object is the provision of a juice catching ring for use in cooking pies, which has no soldered parts to melt in an oven, and having no obstructions on its bottom which might catch on the base of an oven.

These and other objects are attained by the novel construction and arrangement of parts hereinafter described and illustrated by the accompanying drawings, forming a part hereof, and in which:

Fig. 1 is an elevational view showing a juice catching ring embodying the invention supporting a pie pan.

Fig. 2 is a plan view of the juice catching ring.

Fig. 3 is a sectional view of the juice catching ring.

Referring to the drawings, the juice catching ring is shown to comprise a short cylindrical body 1 having an internally projecting arcuate flange 2 which forms a groove for catching juices, the edge 3 of the flange supporting, as shown in Fig. 1, the bead 5 of a pie pan. The lower edge of the body 1 is curled to provide a bead 4 which enables the ring to be moved easily about an oven.

The rings can be made of various metals, such as aluminum, steel, and materials such as plastics, glass, etc.

It will be seen that with the inner edge of the flange of the cylindrical wall spaced below the upper edge of the wall of the ring that the ring prevents juices from pies being boiled over into an oven, and thus prevents messy ovens which are very difficult to clean. It is easy to trim pie crust when the ring is used; and the groove being shallow enables easy cleaning and insures sanitation. Also, there are no obstructions on the bottom of the ring which might catch on the base of an oven. The juice catching groove of the ring being shallow and close to the edge of the pie crust makes it unnecessary to place water in the groove as the surplus juice is sufficient to retard excessive baking of the edges of the pie.

The juice catching ring is simple in structure, which is a feature giving it great effectiveness, facilitating handling and cleaning, and making it inexpensive to manufacture.

The above description is to be considered as illustrative and not limitative of the invention, of which modifications can be made without departing from the spirit and scope of the appended claim.

The invention having been described, what is claimed is:

In a pie pan support, the combination which comprises a cylindrical wall having an inwardly extended flange carried by the upper edge and said flange having an arcuate downwardly disposed liquid retaining annular recess therein providing a continuous trough, the upper surface of the inner edge of said flange being spaced below the upper edge of the said cylindrical wall and positioned to receive the bead of a pie tin with the peripheral edge of the pie tin positioned over the recess and between the inner edge of the flange and cylindrical wall whereby juices from a pie in the pie tin drop in the trough and steam flavored by the juices and from liquids in the trough contacts the peripheral edge of the pie crust to properly moisten the rim of the pie and insure uniform baking thereof.

ARTHUR VREDENBURG.

REFERENCES CITED

The following references are of record in the file of this patent:

UNITED STATES PATENTS

| Number | Name | Date |
|---|---|---|
| 1,090,045 | Gladden | Mar. 10, 1914 |
| 1,431,696 | Shankland | Oct. 10, 1922 |
| 1,509,445 | Schwartz | Sept. 23, 1924 |
| 1,957,013 | Howard | May 1, 1934 |